(12) United States Patent
Meynard et al.

(10) Patent No.: US 6,885,569 B2
(45) Date of Patent: Apr. 26, 2005

(54) ENERGY CONVERTING DEVICE (75) Inventors: Thierry Meynard, Beauzelle (FR); Elie Lefeuvre, Lyons (FR)

(73) Assignees: Centre National de la Recherche Scientifique (C.N.R.S.), Paris (FR); C.I.R.T.E.M., Labege Cedex (FR); Institut National Polytechnique de Toulouse, Toulouse Cedex 4 (FR)

( * ) Notice: Subject to any disclaimer, the term of this patent is extended or adjusted under 35 U.S.C. 154(b) by 0 days.

(21) Appl. No.: 10/484,768
(22) PCT Filed: Jul. 16, 2002
(86) PCT No.: PCT/FR02/02532
§ 371 (c)(1),
(2), (4) Date: Aug. 11, 2004
(87) PCT Pub. No.: WO03/010875
PCT Pub. Date: Feb. 6, 2003

(65) Prior Publication Data
US 2004/0257843 A1 Dec. 23, 2004

(30) Foreign Application Priority Data
Jul. 25, 2001 (FR) ............................................ 01 09944

(51) Int. Cl.$^7$ .............................................. H02M 5/293
(52) U.S. Cl. ......................................... 363/124; 363/65
(58) Field of Search ................................. 323/320, 324; 363/65, 124

(56) References Cited

U.S. PATENT DOCUMENTS

| 3,931,563 A | * | 1/1976 | Stacey .......................... 363/10 |
| 5,208,740 A | * | 5/1993 | Ehsani ......................... 363/124 |
| 5,737,201 A | | 4/1998 | Foch et al. .................... 363/60 |
| 6,643,151 B1 | * | 11/2003 | Nebrigic et al. .............. 363/59 |

OTHER PUBLICATIONS

Kwon B–H et al:, "Novel topologies of AC choppers", IEE Proceedings: Electric Power Applicatons, Institution of Electrical Engineers, GB, vol. 143, No. 4, Jul. 10, 1996, pp. 323–330, XP006006397, ISSN: 1350–2352 cited in the application the whole document.

* cited by examiner

*Primary Examiner*—Jeffrey Sterrett
(74) *Attorney, Agent, or Firm*—Young & Thompson (57) ABSTRACT

Device for reversible conversion of electric power capable of being connected between at least an input alternating voltage source and at least a load forming an output alternating current source, each input alternating voltage source having a supply terminal and a neutral terminal. The device comprises at least a switching block and includes an input terminal for connecting the supply terminal, a single reference terminal and an output terminal. Each switching block consists of a switching matrix formed of capacitors and switching cells, individually controlled. Each reference terminal is connected to a reference point other than the neutral terminal, and each block comprises elements for permanently maintaining at a constant or null sign the difference of potential between the first input terminal and the reference terminal.

21 Claims, 6 Drawing Sheets

ENERGY CONVERTING DEVICE

The present invention relates to a device for reversibly converting electrical energy with chopping between one or more alternating voltage sources and one or more alternating current sources.

Existing solutions based on contactors or thyristors and transformers allow this type of conversion to be carried out.

However, these solutions allow only adjustment which is discrete and therefore imprecise, and the response thereof is slow.

These solutions further require transformers having intermediate taps in order to carry out the adjustment of the voltage. The cost of the assembly is therefore high.

Other solutions for producing energy converting devices use associations of capacitors and switches allowing the current to be commutated between the various capacitors and the signal to be converted in this manner.

Such use of commutated capacitors for carrying out a conversion of a signal is a conventional technique of electronics.

A semi-conductor network acting as switches and capacitors arranged in the form of a matrix between a voltage source and a current source is used in the device described in French patent application No. 00 06 786, filed on 26 May 2000, by the same applicant.

However, the device described in French patent application 00 06 786 does not allow a conversion to be carried out between an alternating voltage source and an alternating current source.

A device which theoretically carries out a conversion between an alternating voltage source and an alternating current source is described in the article by D.-H. KWON, D.-D. MIN and J.-H.KIM, entitled "Novel topologies of AC choppers", published in IEE Proceedings on Electr. Power Appl., pages 323–330, volume 143, No. 4, July 1996.

However, this article describes, in a purely theoretical manner, a specific case having three alternating current sources and disregards practical installation problems relating to electronic circuits of average and high power.

In particular, it will be appreciated that the electronic circuits of this document pose excess-voltage risks which are high at low power and critical at high power, in particular greater than 750 kW.

The object of the invention is to overcome this problem by allowing reversible conversion of electrical energy between one or more alternating voltage sources and one or more alternating current sources, which conversion is reliable for all power levels.

To this end, the invention relates to a device for reversibly converting electrical energy, which device can be connected between at least one input alternating voltage source and at least one load which forms an output alternating current source, each input alternating voltage source having a supply terminal and a neutral terminal, the device comprising at least one commutation block which is suitable for being associated with an output alternating current source and which comprises an input terminal, to which the supply terminal of the input alternating voltage source can be connected, at least one reference terminal and an output terminal, to which the load which forms the output alternating current source can be connected, the block also comprising a commutation matrix which is formed by capacitors and commutation cells, which cells are controlled individually by means for controlling the operation thereof, characterised in that the or each commutation block comprises a single reference terminal which is at a reference potential different from the potential of the neutral terminal of the source, and in that it comprises means for permanent maintenance, at a constant sign or zero, of the potential difference between the input terminal and the reference terminal of the or each commutation block.

According to other features:

the matrix of the or each block comprises at least one level which comprises at least one row of commutation cells, which are arranged on the basis of a single commutation cell for each level of the same row, each commutation cell being composed of two elements which form a switch, the or each level defining two groups of switches which are connected in series and the commutation matrix then defining two extreme groups of switches, each commutation cell being associated with a capacitor which is sized in order to maintain, between the homologous terminals of the two switches of each commutation cell, a charging voltage which is equal to a fraction of the voltage of the input alternating voltage source, which voltage fraction decreases as a function of the row thereof starting from this source, the capacitors of the same row being connected in series between the two extreme groups of switches;

all of the switches of each commutation cell are unidirectional in terms of voltage and bidirectional in terms of current;

all of the switches of each commutation cell are formed by electronic components which are unidirectional in terms of voltage and unidirectional in terms of current;

all of the switches of each commutation cell are formed by electronic components which are all identical, and in that each switch is constituted by identical elementary switches which are connected in series and the number of which is a function of the maximum voltage applicable between the terminals thereof;

it comprises means for monitoring the control means comprising means for processing a reference signal in order to supply at the output a plurality of secondary reference signals, and means for transmitting each secondary reference signal to all of the control means of the commutation cells of the same level of all of the matrices of all of the blocks of the device;

the processing means are suitable for supplying a plurality of secondary reference signals which are functions related by a portion of the reference signal, each secondary reference signal of a level having at all times a value greater than or equal to the value of a secondary reference signal of a level which is closer to the voltage source;

the monitoring means comprise means for generating a synchronisation signal in order to supply at the output a plurality of secondary synchronisation signals, and means for transmitting each secondary synchronisation signal to all of the control means of the commutation cells of the same row of all of the matrices of all of the blocks of the device;

it comprises a single commutation block and can be connected to a single input alternating voltage source, the neutral terminal of which is accessible in order to allow a connection and which is associated with a single load which forms an output alternating current source, and in that it further comprises a first capacitor which can be connected between the neutral terminal of the source and an output terminal of the load and a second capacitor which can be connected between the reference terminal of the commutation block and the output terminal of the load;

it comprises a single commutation block and can be connected to a single input alternating voltage source, the neutral terminal of which is accessible in order to allow a connection and which is associated with a single load which forms an output alternating current source, and it comprises a shift block which comprises an input terminal which is suitable for being connected to the neutral terminal of the source, a reference terminal which is connected to the reference terminal of the commutation block and an output terminal which can be connected to the output terminal of the load, the shift block allowing the potential of the output terminal, which can be connected to an output terminal of the load, to be modified;

it comprises a first commutation block and a second commutation block and can be connected to a single input alternating voltage source, the neutral terminal of which is accessible in order to allow a connection and which is associated with a single load which forms an output alternating current source, the reference terminals of the two commutation blocks being connected to each other, the first commutation block being suitable for being connected at the input terminal thereof to the supply terminal of the source, the second commutation block being suitable for being connected at the input terminal thereof to the neutral terminal of the source, the device further being suitable for connecting the load between the output terminals of the two commutation blocks;

the means for permanent maintenance, at a constant sign or zero, of the potential difference between the input terminal and the reference terminal comprise inhibiting means which are associated with the or each commutation block and which comprise means for evaluating the sign of the potential difference between the input terminal and the neutral terminal of the source, which evaluation means are suitable for supplying at the output a signal for inhibiting the commutation block, and the or each commutation block is suitable for connecting together the input terminal, the reference terminal and the output terminal thereof when the inhibiting signal is received;

the inhibiting means are suitable for supplying the inhibiting signal when the potential difference between the input terminal and the neutral terminal of the source is negative, the commutation matrix further being formed by electronic components which are orientated so that the commutation block supports only a positive voltage or zero voltage;

the inhibiting means are suitable for supplying the inhibiting signal when the potential difference between the input terminal and the neutral terminal of the source is positive, the commutation matrix further being formed by electronic components which are orientated so that the commutation block supports only a negative voltage or zero voltage;

it can be connected to at least two input alternating voltage sources, the neutral terminals of which are all connected to each other and which are associated with the same number of loads which form output alternating current sources and output terminals of which are also all connected to each other, and it comprises a plurality of commutation blocks, the reference terminals of the commutation blocks all being connected to each other;

the neutral terminals of the sources are accessible in order to allow a connection, and it comprises a shift block which comprises an input terminal which is suitable for being connected to the neutral terminals, a reference terminal which is connected to all of the reference terminals of the commutation blocks and an output terminal which can be connected to all of the output terminals of the loads which form an output alternating current source, the shift block allowing the potential of the output terminal, which can be connected to the output terminals of the loads, to be modified;

the means for permanent maintenance, at a constant sign or zero, of the potential difference between the input terminal and the reference terminal comprise inhibiting means which are associated with the or each commutation block and which comprise means for comparing the potential difference between the input terminals and a terminal having a potential common to all of the commutation blocks, such as the neutral terminals of the sources, the output terminals of the loads or the reference terminals, which means are suitable for supplying at the output signals for inhibiting the commutation blocks, and the or each commutation block is suitable for connecting together the input terminal, the reference terminal and the output terminal thereof when the inhibiting signal is received;

the inhibiting means are suitable for supplying an inhibiting signal only to the block whose potential difference between the input terminals and a terminal having a potential common to all of the commutation blocks, such as the neutral terminals of the sources, the output terminals of the loads or the reference terminals, is the weakest, the commutation matrices further being formed by electronic components which are orientated so that the blocks support only a positive voltage or zero voltage;

the inhibiting means are suitable for supplying an inhibiting signal only to the block whose potential difference between the input terminals and a terminal having a potential common to all of the commutation blocks, such as the neutral terminals of the sources, the output terminals of the loads or the reference terminals, is the greatest, the commutation matrices further being formed by electronic components which are orientated so that the blocks support only a negative voltage or zero voltage;

it is suitable for being connected to three input alternating voltage sources which form the three phases of a three-phase electrical energy supply network;

each matrix of each commutation block comprises a single capacitor and a single commutation cell.

The invention will be better understood from a reading of the description below which is given purely by way of example and with reference to the drawings, in which:

FIG. 9 is an illustration of the course of the reference signals of the device described with reference to FIGS. 6 to 8;

FIG. 10 is an illustration of the course of the control signals of the device described with reference to FIGS. 6 to 8;

FIG. 11 is an illustration of the course of the voltage between the input terminal and the reference terminal of a commutation block of the device described with reference to FIGS. 6 to 8;

FIG. 12 is an illustration of the course of the output voltages of the commutation blocks of the device described with reference to FIGS. 6 to 8; and FIG. 13 is an illustration of the course of the output currents of the commutation blocks of the device described with reference to FIGS. 6 to 8.

Figure 1:
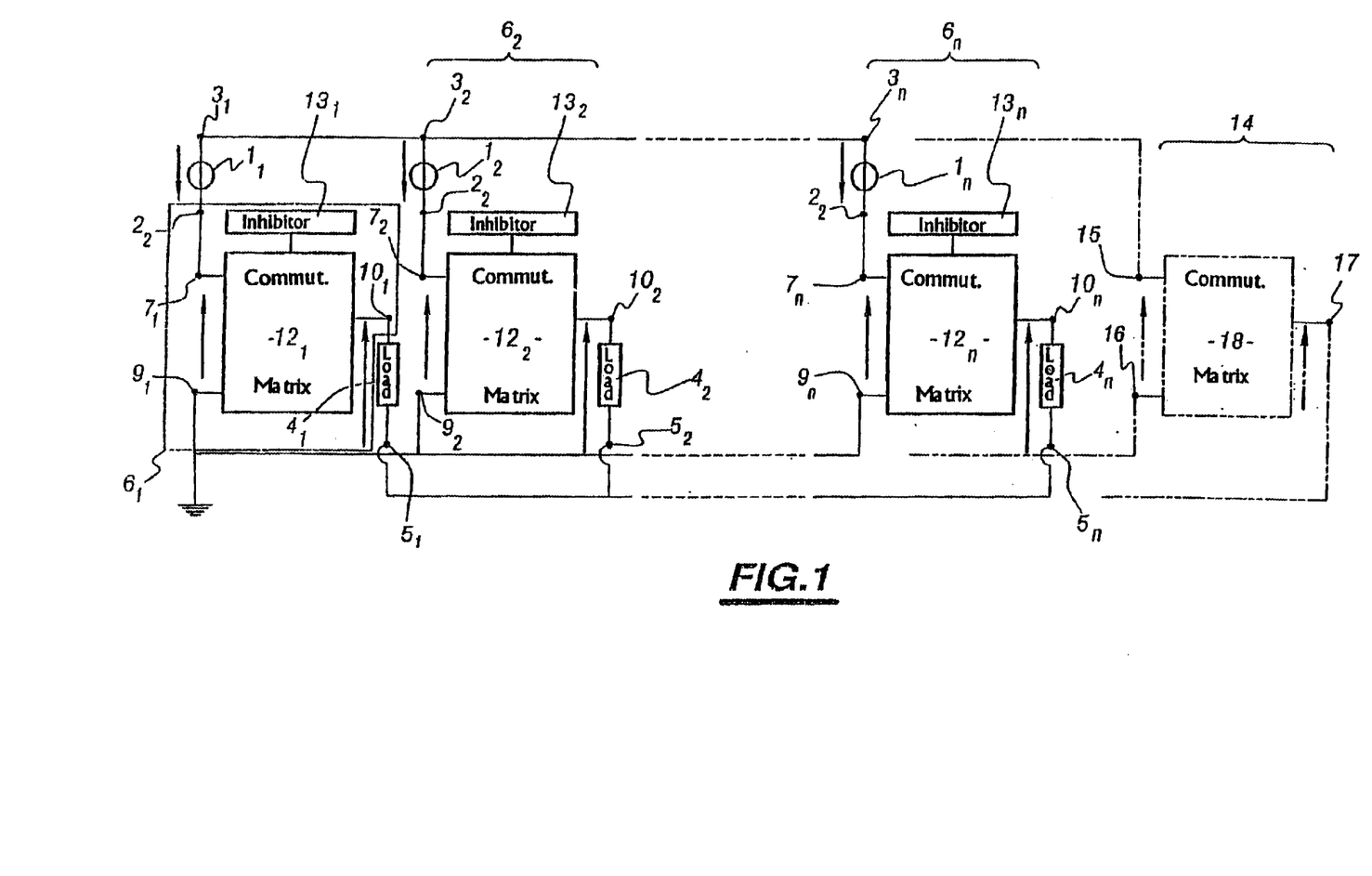
FIG. 1 is a schematic block diagram of a converting device according to the invention.

FIG. 1 illustrates an energy converting device according to the invention.

This device is connected to a plurality of input alternating voltage sources $1_1$ to $1_n$ which are constituted, for example, by the various phases of a multi-phase supply network.

The input alternating voltage sources $1_1$ to $1_n$ are all out of phase relative to each other. In this manner, if the system has n input alternating voltage sources, they are out of phase relative to each other by $$\frac{2\pi}{n}.$$

These input alternating voltage sources $1_1$ to $1_n$ each comprise a supply terminal $2_1$ to $2_n$ and a neutral terminal $3_1$ to $3_n$, which neutral terminals $3_{1\ to\ 3n}$ can be accessible or not. They are associated with loads $4_1$ to $4_n$ by means of commutation blocks $6_1$ to $6_n$ which are integrated in the energy converting device. The loads $4_1$ to $4_n$ are bi-polar elements which are constituted, for example, by resistors in series with inductors, and act as current sources. They each have an output terminal $5_1$ to $5_n$.

Each of the commutation blocks $6_1$ to $6_n$ comprises an input terminal $7_1$ to $7_n$ which is connected to the supply terminal $2_1$ to $2_n$ of the voltage source $1_1$ to $1_n$ which is associated therewith.

Each of the blocks $6_1$ to $6_n$ further comprises a single reference terminal $9_1$ to $9_n$ and an output terminal $10_1$ to $10_n$. It also comprises a commutation matrix $12_1$ to $12_n$ and associated inhibiting means $13_1$ to $13_n$ which are suitable for connecting together the input terminal $7_j$, the reference terminal $9_j$ and the output terminal $10_j$, of the block, thereby inhibiting the block in question.

When the device comprises at least two input alternating voltage sources $1_1$ to $1_n$, each associated with a commutation block $6_1$ to $6_n$, the neutral terminals $3_1$ to $3_n$ of the sources $1_1$ to $1_n$ are all connected together at the same potential.

For example, this potential is the neutral of the supply network corresponding to the input alternating voltage sources $1_1$ to $1_n$.

Furthermore, the reference terminals $9_1$ to $9_n$ of all of the commutation blocks $6_1$ to $6_n$ are connected to each other and constitute a common reference potential. The output terminals $5_1$ to $5_n$ of the loads $4_1$ to $4_n$ are also all connected to each other at the same potential.

Finally, the inhibiting means $13_1$ to $13_n$ comprise means for comparing existing voltages between the input terminals $7_1$ to $7_n$ and a terminal having a common potential for all of the blocks $6_1$ to $6_n$, such as the reference terminals $9_1$ to $9_n$ the output terminals $5_1$ to $5_n$ or the neutral terminals $3_1$ to $3_n$.

In FIG. 1, as well as in the other Figures, the inhibiting means $13_1$ to $13_n$ are illustrated delocalised at the commutation blocks $6_1$ to $6_n$. However, these circuits can also be grouped into a central inhibiting circuit comprising single comparison means and controlling all of the blocks $6_1$ to $6_n$.

When the neutral terminals $3_1$ to $3_n$ are accessible, the converting device advantageously comprises a shift block 14 whose architecture is identical to that of the commutation blocks, but without being associated with an input alternating voltage source.

The input terminal 15 is then connected to all of the neutral terminals $3_1$ to $3_n$ of the sources $1_1$ to $1_n$.

The shift block 14 also comprises a reference terminal 16 and an output terminal 17. It is constituted by a commutation matrix 18 which is identical to the matrices $12_1$ to $12_n$ of the commutation blocks $6_1$ to $6_n$.

Figure 7:
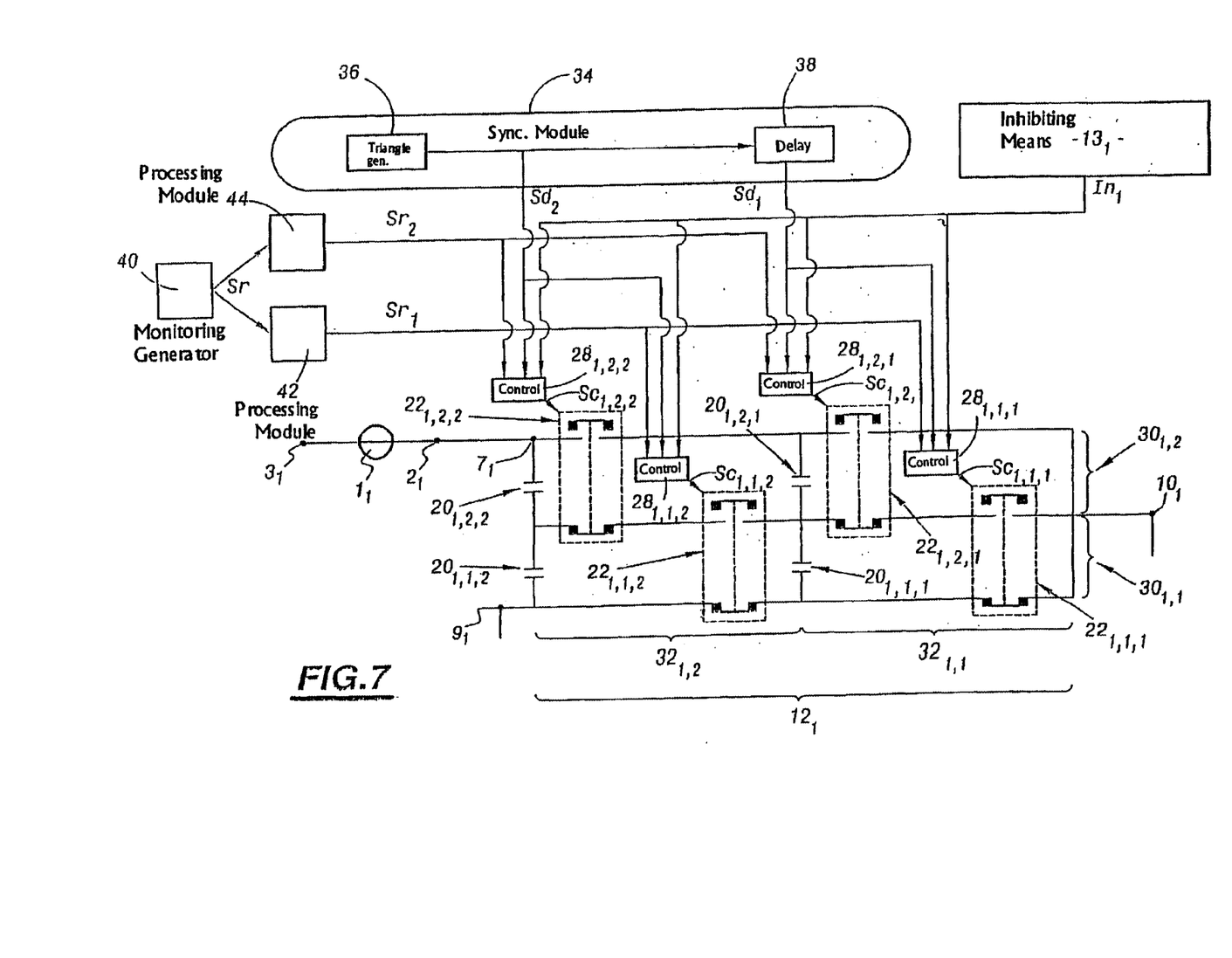
FIGS. 7 and 8 are schematic electrical diagrams of a commutation matrix used in the invention when it comprises two levels and two rows, further illustrating in detail a control assembly of this device.
Figure 8:
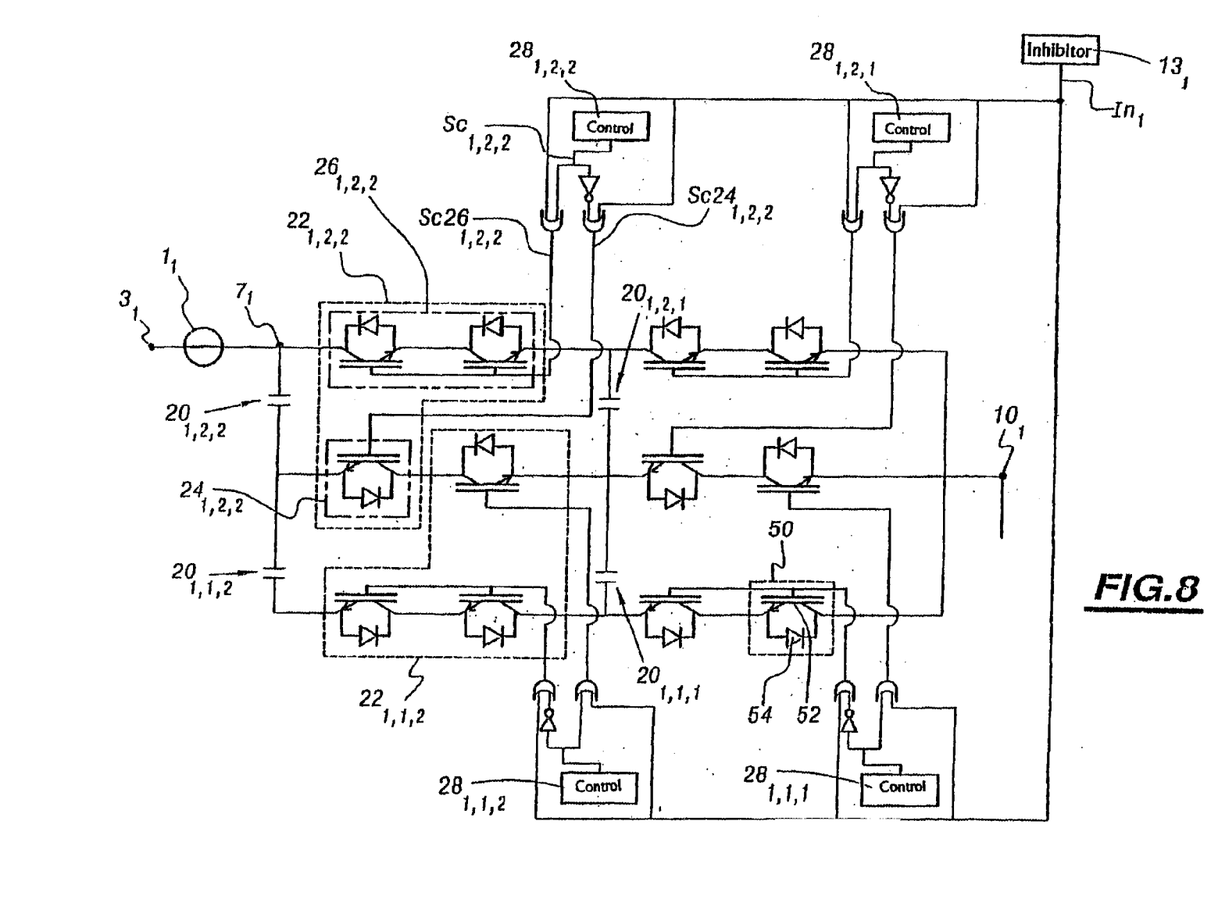

The reference terminal 16 is connected to the reference terminals $9_1$ to $9_n$ of the commutation blocks $6_1$ to $6_n$ and the output terminal 17 is connected to the output terminals $5_1$ to $5_n$ of the loads $4_1$ to $4_n$, as is described with reference to FIGS. 2, 7 and 8.

The shift block 14 allows the potential of the output terminals $5_1$ to $5_n$ of loads $4_1$ to $4_n$ to be shifted, as is described with reference to FIGS. 2, 7 and 8.

The converting device is thereby adapted to the type of the loads $4_1$ to $4_n$.

Figure 2:
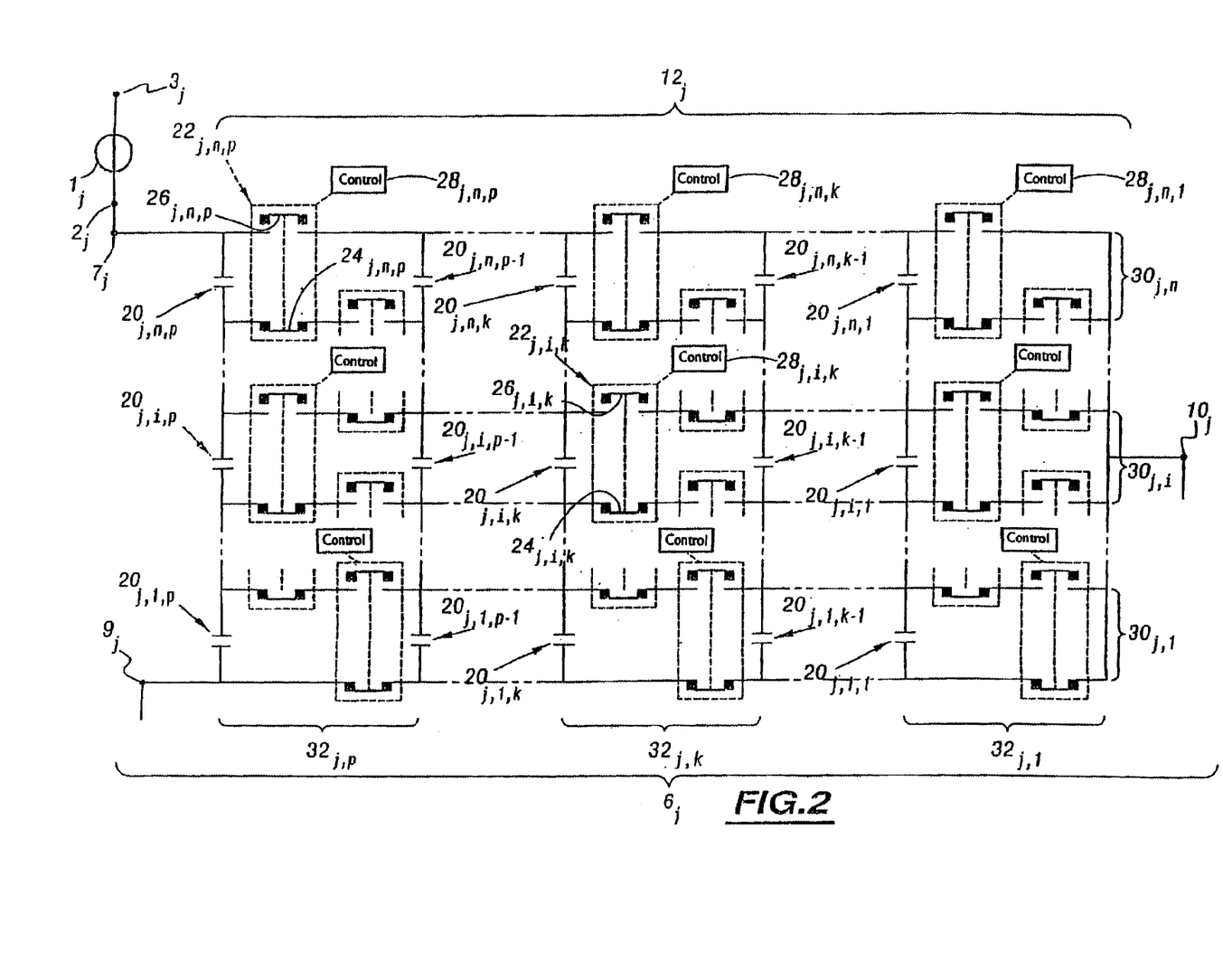
FIG. 2 is a schematic electrical diagram of a commutation block.

FIG. 2 illustrates the architecture of a commutation matrix $12_j$, similar to those used in the invention.

The commutation block $6_j$ comprises an input terminal $7_j$, to which the supply terminal $2_j$ of an alternating voltage source $1_j$, an output terminal $10_j$ and a reference terminal $9_j$ are connected.

The commutation block $6_j$ comprises a commutation matrix $12_j$ which is formed by capacitors $20_{j,1,1}$ to $20_{j,n,p}$ and commutation cells $22_{j,1,1}$ to $22_{j,n,p}$.

Each commutation cell $22_{j,i,k}$ is constituted by two switches $24_{j,i,k}$ and $26_{j,i,k}$ and is connected, for the monitoring thereof, to control means $28_{j,i,k}$ which are specific thereto.

In this device, the switches are unidirectional in terms of voltage and bidirectional in terms of current and the electronic components which form the switches $24_{j,i,k}$ and $26_{j,i,k}$ of the commutation cells $22_{j,1,1}$ to $22_{j,n,p}$ are unidirectional in terms of current and voltage, as is described with reference to FIG. 8.

The capacitors $20_{j,i,k}$ and commutation cells $22_{j,i,k}$ which form the matrix $12_j$ as a whole are ordered in n levels $30_{j,1}$ to $30_{j,n}$ and p rows $32_{j,1}$ to $32_{j,p}$.

Each matrix $12_j$ optionally comprises a single level $30_{j,1,1}$ and a single row $32_{j,1,1}$. In this case, the matrix $12_j$ is constituted by a single commutation cell $22_{j,1,1}$ and a single capacitor $20_{j,1,1}$.

The n levels of the matrix $12_j$ define n+1 groups of switches.

The first group of switches is constituted by the series-connected circuit breakers $24_{j,1,1}$ to $24_{j,1,p}$ of the p commutation cells of the first level. The (n+1)th group of switches is constituted by the series-connected switches $26_{j,n,1}$ to $26_{j,n,p}$ of the p commutation cells of the nth level. The ith group of switches, with $1 < i \leq n$, is constituted by the switches $24_{j,i,1}$ to $24_{j,i,p}$ of the p commutation cells of the ith level and the switches $26_{j,i-1,1}$ to $26_{j,i-1,p}$ of the p commutation cells of the (i−1)th level, alternately connected in series.

All of the groups of switches are connected at one of the ends thereof to the output terminal $10_j$ of the commutation block $6_j$.

The matrix $12_j$ of the commutation block $6_j$ further defines two extreme groups of switches. The first one is connected at one end to the output terminal $10_j$ and at the other end to the reference terminal $9_j$. The (n+1)th is connected at one end to the output terminal $10_j$ and at the other end to the input terminal $7_j$.

Between two successive rows $32_{j,k}$ and $32_{j,k+1}$, n capacitors of row k, $20_{j,1,k}$ to $20_{j,n,k}$, are connected in series on the basis of one per level. In this manner, at the ith level, the capacitor $20_{j,i,k}$ is connected, on the one hand, to the ith group of switches and, on the other hand, to the (i+1)th group of switches.

Each capacitor $20_{j,i,k}$ is suitable for maintaining between the terminals thereof a charging voltage, being an increasing function of row k thereof and representing a fraction of the partial voltage of the voltage source $1_j$.

All of the commutation blocks $6_1$ to $6_n$ used in a converting device according to the invention, as well as the shift block 14, are constituted in the same manner as the commutation block $6_j$ described with reference to FIG. 2.

In the same device, all of the commutation blocks $6_1$ to $6_n$ further comprise a matrix $12_1$ to $12_n$ which comprises the same number of levels and rows, and therefore the same number of commutation cells and capacitors.

The operation of such a device will now be explained.

Each of the commutation blocks $6_1$ to $6_n$ has two operating modes which are imposed by the inhibiting means $13_1$ to $13_n$.

In a first operating mode, a commutation block $6_j$ converts the input signal into an output signal of the same type and having the same frequency.

In this first operating mode, the commutation cells $22_{j,i,k}$ of the commutation blocks $6_1$ to $6_n$ are controlled so as to maintain the two switches of each cell in opposite states.

The voltage between the input terminal $7_j$ and the reference terminal $9_j$ therefore has a constant sign. The sign thereof is determined by the orientation of the components in the matrix $12_j$.

For example, a given orientation of the components, described below with reference to FIG. 8, leads to a potential difference between the input terminal $7_j$ and the reference terminal $9_j$ that is constantly positive.

In this case, when the comparison means of the inhibiting means $13_j$ detect that the voltage between the input terminal $7_j$ and a terminal having a potential common to all of the blocks $6_1$ to $6_n$, such as the neutral terminal $3_1$ to $3_n$, the output terminal $5_1$ to $5_n$ or the reference terminal $9_1$ to $9_n$, is less than the voltages between the input terminals of all of the other blocks of the system, and the same terminal having a common potential, the inhibiting means $13_j$ supply an inhibiting signal to the commutation block $6_j$.

The commutation block then switches into a second operating mode, known as the "commutation block inhibition" mode, all of the switches forming the commutation cells of a commutation block $6_j$ are closed, thereby short-circuiting the input terminal $7_j$, the reference terminal $9_j$ and the output terminal $10_j$ of the commutation block $6_j$.

When the orientation of the components imposes a voltage between the terminals $7_j$ and $9_j$ that is constantly negative during the commutation phases, the inhibition criterion is inverted.

Owing to the inhibiting conditions of a commutation block which are described above, there can be only one commutation block functioning at a time in the inhibition mode among all of the commutation blocks $6_1$ to $6_n$ of the converting device.

If the device comprises a shift block, it functions in the same manner as a non-inhibited commutation block.

The input alternating voltage sources $1_1$ to $1_n$ being out of phase relative to each other, each of the commutation blocks $6_1$ to $6_n$ switches to the inhibited mode for a period of $$\frac{2\pi}{n}.$$

In such a device, placing all of the reference terminals $9_1$ to $9_n$ and all of the neutral terminals $3_1$ to $3_n$ at the same potential, the inhibiting periods controlled by the inhibiting means and the orientation of the components ensure that the voltage between the input terminal $7_1$ to $7_n$ and the reference terminal $9_1$ to $9_n$ of each of the commutation blocks is maintained at a constant sign or zero.

These voltages, referred to as $Vb_1$ to $Vb_n$, respectively, remain directly linked with the source voltages $1_1$ to $1_n$ referred to as $V1_1$ to $V1_n$.

It will be appreciated that, at all times, the relationship $Vb_1-Vb_3=V1_1-V1_3$ is verified. This relationship is verified for all of the blocks by circular permutation.

Similarly, the combined output voltages of the blocks referred to as $V10_1-V10_j$ are also sinusoidal and generate in the loads $4_1$ to $4_n$ sinusoidal currents which have the same frequency as the input alternating voltage sources $1_1$ to $1_n$ and which are out of phase relative to each other by $$\frac{2\pi}{n}.$$

Figure 3:
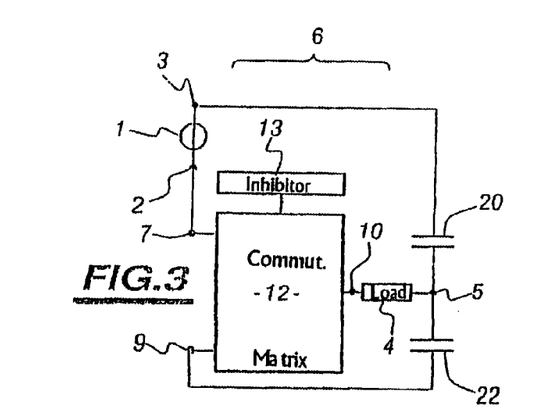
FIGS. 3, 4 and 5 are block diagrams, each illustrating in detail the production of a device according to the invention, in the specific case of connection to a single input alternating voltage source.

In FIG. 3, the architecture of a device according to the invention which is connected to a single input alternating voltage source 1 is defined.

The device is connected to a load 4 which is associated with an input alternating voltage source 1, the neutral terminal 3 of which is accessible and comprises a commutation block 6.

The commutation block 6 comprises an input terminal 7 which is connected to the supply terminal 2 of the input alternating voltage source 1. It further comprises a reference terminal 9, an output terminal 10 which is connected to the load 4 and a commutation matrix 12 which is associated with inhibiting means 13.

In this configuration, the device further comprises a first capacitor 20 which is connected between the neutral terminal 3 of the source 1 and the output terminal 5 of the load 4 and a second capacitor 22 which is connected between the output terminal 5 of the load 4 and the reference terminal 9 of the commutation block 6.

In this manner, a circuit is obtained which is suitable for constantly maintaining a potential difference between the reference point 9 of the commutation block 6 and the neutral terminal 3 of the input alternating voltage source 1.

In this configuration, the inhibiting means 13 of the commutation block 6 further comprise means for evaluating the sign of the potential difference between the input terminal 7 and the neutral terminal 3, which corresponds to the potential difference at the source terminals 1.

When this voltage has a given sign, that is, for example, positive or zero, the block 6 functions as a commutation block. If this voltage has the opposite sign, negative in the example, the inhibiting means 13 control the commutation matrix 12 so that all of the switches are closed, thereby short-circuiting the input terminal 7, the reference terminal 9 and the output terminal 10, the block 6 then switches to the inhibited mode.

In order to reconstitute the integrity of a sinusoidal signal, the circuit must advantageously comprise means for shifting the signal of the input alternating voltage source 1 so that the input voltage is always positive or zero.

Figure 4:
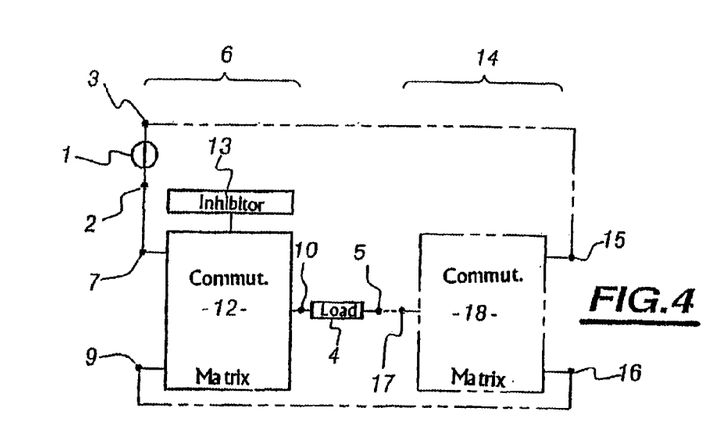

FIG. 4 illustrates the case of a device according to the invention which is connected to a single input alternating voltage source 2, the neutral terminal 3 of which is accessible, and which device comprises a shift block 14.

As has been described with reference to FIG. 3, the device is connected to the input alternating voltage source 1, which is associated with the load 4 acting as a source of output current, and comprises the commutation block 6.

The commutation block 6 comprises the matrix 12 which is associated with the inhibiting means 13.

The device further comprises a shift block 14 which has an input terminal 15 which is connected to the neutral terminal 3 of the source 1, an output terminal 17 which is connected to the output terminal 5 of the load 4 and a reference terminal 16 which is connected to the reference terminal 9 of the commutation block 6.

The shift block 14 allows the potential of the output terminal 5 of the load 4 to be modified, as is described with reference to FIGS. 2, 7 and 8.

Figure 5:
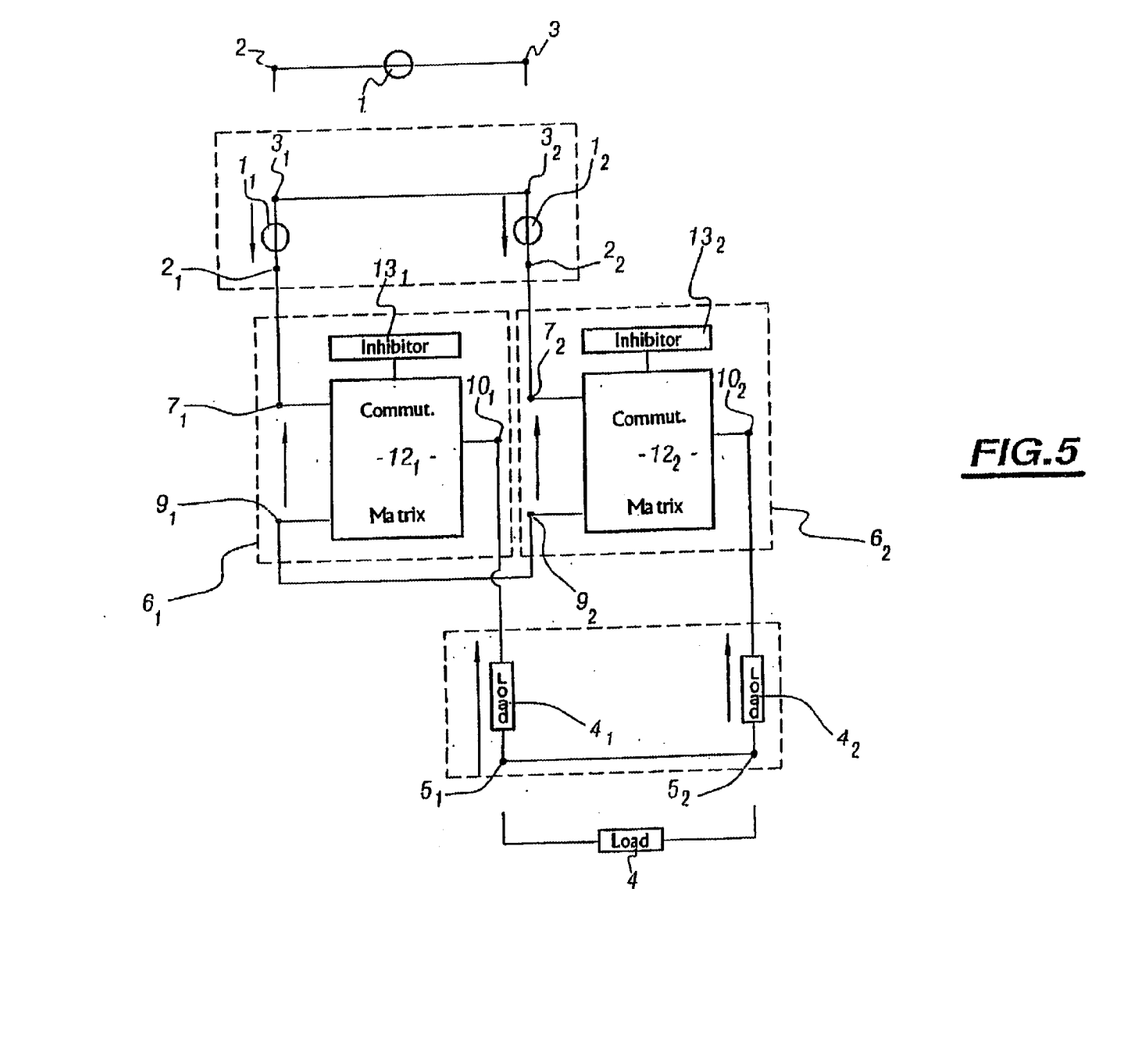

FIG. 5 illustrates a variant of the case of a device according to the invention which is connected to a single input alternating voltage source 1, the neutral terminal 3 of which is accessible.

When the device is connected to a single input alternating voltage source 1 whose supply terminal 2 and neutral terminal 3 are accessible, this input alternating source 1 can be considered to be formed by two alternating sources 11 and 12 in phase-opposition.

The device therefore comprises two commutation blocks $6_1$ and $6_2$ which are connected to the two virtual sources $1_1$ and $1_2$ in conventional manner, as has been described with reference to FIG. 1, the neutral terminal 3 acting as the supply terminal $2_2$.

The commutation block $6_1$ is associated with a load $4_1$ and the commutation block $6_2$ is associated with a load $4_2$. These two loads $4_1$ and $4_2$ are connected to each other at the output terminals $5_1$ and $5_2$ thereof.

Optionally, the two loads $4_1$ and $4_2$ can be replaced with a single load 4 which is connected between the output points $10_1$ and $10_2$ of the commutation blocks $6_1$ and $6_2$.

Such a device functions in the same manner as the general device described with reference to FIG. 1.

In such a physical configuration, however, it is not possible to connect a shift block.

The operation of a device according to the invention is described on the basis of the specific case described with reference to FIGS. 6 to 8.

Figure 6:
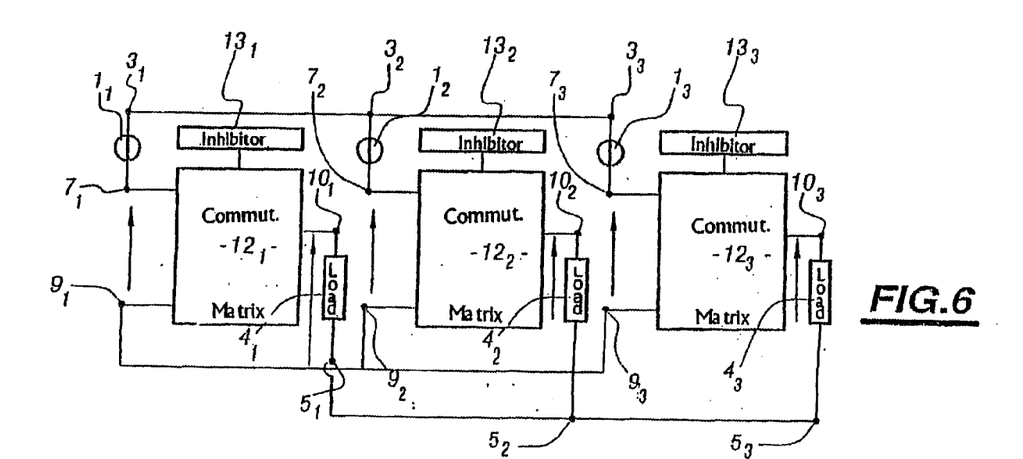
FIG. 6 is a block diagram illustrating in detail an energy converting device according to the invention in the specific case of three input alternating voltage sources.

FIG. 6 illustrates a converting device according to the invention in the specific case in-which it is connected to three input alternating voltage sources $1_1$, $1_2$ and $1_3$ which are associated with three loads $4_1$, $4_2$ and $4_3$ by means of commutation blocks $6_1$, $6_2$ and $6_3$.

The three input alternating voltage sources $1_1$, $1_2$ and $1_3$ supply the same sinusoidal alternating signal of frequency f and are phase-shifted relative to each other by temporal spacing of $$\frac{1}{3f}.$$

They each have a supply terminal $2_1$, $2_2$ and $2_3$ and a neutral terminal $3_1$, $3_2$ and $3_3$ which can be accessible or not.

For example, in the case of a three-phase supply network, each of the input alternating voltage sources represents a phase of the network.

Each commutation block $6_1$, $6_2$ and $6_3$ comprises an input terminal $7_1$, $7_2$ and $7_3$, a reference terminal $9_1$, $9_2$ and $9_3$ and an output terminal $10_1$, $10_2$ and $10_3$. The input terminals $7_1$, $7_2$ and $7_3$ are connected to the supply terminals $2_1$, $2_2$ and $2_3$ and are indicated by the same references $7_1$, $7_2$ and $7_3$.

They comprise commutation matrices $12_1$, $12_2$ and $12_3$ which are associated with inhibiting means $13_1$, $13_2$ and $13_3$, respectively.

In a specific case, each commutation matrix $12_1$, $12_2$ and $12_3$ comprises only one level and only one row and therefore only one commutation cell which is associated with a single capacitor.

As has been defined with reference to FIG. 1, the neutral terminals $3_1$, $3_2$ and $3_3$ are all connected to each other and define a neutral which is common to the three input alternating voltage sources $1_1$, $1_2$ and $1_3$.

The reference terminals $9_1$, $9_2$ and $9_3$ are connected to each other, as are the output terminals $5_1$, $5_2$ and $5_3$ of the loads $4_1$, $4_2$ and $4_3$.

The details of the commutation block $6_1$ and the control system thereof are described with reference to FIGS. 7 and 8.

The matrix $12_1$ of the block $6_1$ comprises two levels $30_{1,1}$ and $30_{1,2}$ and two rows $32_{1,1}$ and $32_{1,2}$. Therefore, it comprises four commutation cells $22_{1,1,1}$, $22_{1,1,2}$, $22_{1,2,1}$ and $22_{1,2,2}$ which are associated with the four capacitors $20_{1,1,1}$, $20_{1,1,2}$, $20_{1,2,1}$ and $20_{1,2,2}$ and which are controlled by four control devices $28_{1,1,1}$, $28_{1,1,2}$, $28_{1,2,1}$ and $28_{1,2,2}$, respectively.

The control system is constituted by a synchronisation module 34 which comprises means 36 for generating symmetrical, alternating, triangular signals of frequency F as well as a delay circuit 38, which produce two signals $Sd_1$ and $Sd_2$ which are phase-shifted by a temporal spacing of $$\frac{1}{2F}$$

and which supply the control devices $28_{1,1,1}$, $28_{1,2,1}$ of the first row and $28_{1,1,2}$, $28_{1,2,2}$ of the second row, respectively.

Of course, if each commutation matrix comprises p rows, the triangular signals which are emitted by the synchronisation module 34 are all phase-shifted by a temporal spacing of $$\frac{1}{pF}.$$

These synchronisation signals are used by all of the commutation blocks of the device.

In the embodiment described here, frequency F is clearly greater than frequency f of the alternating voltage sources $1_1$, $1_2$ and $1_3$ and is selected to represent more precisely a multiple of f for the sake of simplicity.

The device also comprises a monitoring signal generator 40 which supplies a continuous reference signal Sr which varies between 0 and 1 and which corresponds to the adjustment of the quantity of energy to be transferred between the input alternating voltage source $6_1$ and the current source $4_1$.

This reference signal Sr is processed at the output of the monitoring generator 40 by two processing modules 42 and 44 of the first and second levels in order to provide at the output two secondary reference signals $Sr_1$ and $Sr_2$, respectively. These two signals $Sr_1$ and $Sr_2$ supply the control devices $28_{1,1,1}$, $28_{1,1,2}$ of the first level and $28_{1,2,1}$, $28_{1,2,2}$ of the second level, respectively.

These secondary control signals are used by all of the commutation blocks of the device.

The four control devices $28_{1,1,1}$ to $28_{1,2,2}$ are synchronised and supply control signals at a frequency F, which signals are suitable for ensuring, outside the inhibiting periods of the block $6_1$, that the two switches of each cell are commutated to opposite states.

Each control device $28_{1,1,1}$ to $28_{1,2,2}$ comprises, for example, a comparator whose logic state at the output is the result of the comparison of three signals, one of which is output by the synchronisation module 34, another by the monitoring generator 40 and a third by the inhibiting means $13_1$.

Therefore, the control device $27_{1,i,k}$ supplies at the output a control signal $Sc_{1,i,k}$ whose value determines the state of the commutation cell $22_{1,i,k}$.

This control signal $Sc_{1,i,k}$ must allow the three states of a commutation cell to be differentiated, that is to say, the two states of opposite commutation of the switches and the inhibiting state, in which the two switches are closed.

An example of such a control system is described with reference to FIG. 8.

In the embodiment described, it will be noted that the switches of the extreme groups can support a voltage double that supported by the switches of the intermediate group.

Advantageously, the switches $24_{1,1,1}$, $24_{1,2,1}$, $26_{1,1,2}$ and $26_{1,2,2}$ of the extreme groups are formed by two identical elementary switches 50 which are arranged in series and which are controlled in order to be in the same state at all times. Each elementary switch 50 is formed by a transistor 52 which is arranged with a diode 54 in an anti-parallel state. In this manner, all of the electronic components forming the switches of a commutation block are identical.

Furthermore, all of the electronic components forming the elementary switches 50 of all of the commutation blocks of a device according to the invention are unidirectional in terms of current and voltage. In the example described with reference to FIG. 8, the voltage between the input terminal $7_1$ and the reference terminal $9_1$ is always positive or zero.

When all of the polarised electronic components of the device are inverted, this voltage is negative or zero.

A variant of the control system will now be explained in detail with regard to the switches of a commutation cell, and more precisely the commutation cell $22_{1,2,2}$.

This cell comprises a first switch $24_{1,2,2}$ which is formed by a single elementary switch 50 and a second switch $26_{1,2,2}$ which is formed by two elementary switches 50. The cell is controlled by the control device $28_{1,2,2}$.

This control device $28_{1,2,2}$ generates a control signal $Sc_{1,2,2}$ and is connected at the output directly to a first logic gate OR and, by means of an inverter, to a second logic gate OR.

The two gates OR are further connected to the inhibiting means $13_1$ and receive signal $In_1$.

The first gate OR is connected at the output to the two elementary switches which constitute the switch $26_{1,2,2}$ in order to supply the control signal $Sc26_{1,2,2}$ which is obtained for an OR logic operation between the signals $Sc_{1,2,2}$ and $In_1$.

The second gate OR is connected at the output to the switch $24_{1,2,2}$ in order to supply the control signal $Sc24_{1,2,2}$ which is obtained by an OR logic operation between the signals $Sc_{1,2,2}$ and $In_1$.

Therefore, it will be appreciated that, when the inhibiting signal $In_1$ equals zero, the control signals $Sc24_{1,2,2}$ and $Sc26_{1,2,2}$ are complementary, which allows commutation to opposite states to be ensured for the two switches which form the cell $22_{1,2,2}$.

When the signal $In_1$ equals 1, the two control signals $Sc24_{1,2,2}$ and $Sc26_{1,2,2}$ equal 1, which corresponds to the closing of the switches $24_{1,2,2}$ and $26_{1,2,2}$. The cell $22_{1,2,2}$ is then inhibited.

The other cells of the device are controlled similarly.

In another example, the control signals are constituted by a numerical control encoded in two bits.

In this manner, when the inhibiting signal $In_1$ equals 0, the control signal $Sc_{1,i,k}$ equals 01 or 00. In the case in which it is equal to 01, the switch $24_{1,i,k}$ of the commutation cell $22_{1,i,k}$ is closed and the switch $26_{1,i,k}$ of the same cell is open. Conversely, when the control signal $Sc_{1,i,k}$ is equal to 00, the switch $24_{1,i,k}$ of the commutation cell $22_{1,i,k}$ is open and the switch $26_{1,i,k}$ of the same cell is closed.

Finally, if the commutation block $6_1$ is inhibited, inhibiting signal $In_1$ is equal to 1, signal $Sc_{1,i,k}$ is equal to 11 or 10, and all of the switches of the commutation cells $22_{1,1,1}$ to $22_{1,2,2}$ are closed.

When the device comprises a shift block, it is controlled in the same manner as a commutation block in the absence of the inhibiting signal. Therefore, all of the switches are controlled in opposed commutations.

The simultaneous control of the two switches of the same cell will not be further described below, being considered to be known in the prior art.

As will be appreciated with reference to FIG. 9, signal $Sr_1$ intended for the control devices of the first level $30_{1,1}$ is equal to 2×Sr between 0 and ½ and is fixed at 1 between ½ and 1. Signal $Sr_2$ intended for the control devices of the second level $30_{1,2}$ is equal to 0 up to ½, then 2× Sr between ½ and 1.

When the matrices $12_1$ to $12_3$ of the commutation blocks $6_1$ to $6_3$ comprise three levels, it is advantageous to determine three secondary control signals. The first is equal to 3× Sr between 0 and ⅓, then being fixed at 1, the second is equal to 0 before ⅓, 3× Sr between ⅓ and ⅔ and 1 after ⅔, and the third is equal to 0 before ⅔ and 3× Sr between ⅔ and 1. Generally, a device which comprises n level(s) has n signals $Sr_1$ to $Sr_n$.

For example, in the device described with reference to FIG. 6 to 9, if signal Sr is equal to 0.25, signal $Sr_1$ equals 0.5 and signal $Sr_2$ is zero.

FIG. 10 illustrates, on the one hand, the course of the three signals $Sr_1$, $Sd_1$ and $In_1$ which are provided at the input of the control device $28_{1,1,1}$ and, on the other hand, the course of the control signal $Sc26_{1,1,1}$ which is provided by the control device $28_{1,1,1}$ to the switch $26_{1,1,1}$ as a function of the signals received at the input.

The control signal $Sc24_{1,1,1}$ directed to the switch $24_{1,1,1}$ is not illustrated.

Signal $Sd_1$ is a triangular signal having an amplitude which varies between 0 and 1 and a frequency F which here is 20 f.

For the first row of the first level, when the inhibiting signal $In_1$ is zero, signal $Sc26_{1,1,1}$ is a signal of rectangular wave form having a zero value when the relationship $Sd_1 > Sr_1$ is verified and which has a value of one when the relationship $Sd_1 < Sr_1$ is verified, as is illustrated with reference to FIG. 10.

This signal and signal $Sc24_{1,1,1}$ are complementary and produce the commutation to opposite states of the switches of the commutation cell $22_{1,1,1}$.

When signal $In_1$ is equal to 1, signals $Sc24_{1,1,1}$ and $Sc26_{1,1,1}$ are fixed at 1 and all of the switches of the commutation cell $22_{1,1,1}$ are closed.

All of the cells of the commutation matrix receive the same inhibiting signal $In_1$, and therefore all of the switches are closed. The block is then in the inhibiting mode.

For the first row of the second level, in the example selected with Sr=0.25, signal $Sr_2$ is zero. In fact, when $In_1$ is zero, $Sr_2$ being less than $Sd_1$, signal $Sc_{1,2,1}$ is equal to zero. The commutation cell $22_{1,2,1}$ is in a fixed state, the switch $26_{1,2,1}$ being open and the switch $24_{1,2,1}$ being closed.

When $In_1$ is equal to 1, the commutation block 6 is inhibited, signals $Sc24_{1,2,1}$ and $Sc26_{1,2,1}$ are fixed at 1 and all of the switches are closed.

For the second row of the device, signal $Sd_2$ is a triangular signal which has an amplitude which varies between 0 and 1 and a frequency F and which is phase-shifted by temporal spacing of $$\frac{1}{2F}$$

relative to signal $Sd_1$. Signals $Sc_{1,1,2}$ and $Sc_{1,2,2}$ are then signals of rectangular wave form which are phase-shifted by temporal spacing of $$\frac{1}{2F}$$

relative to signals $Sc_{1,1,1}$ and $Sc_{1,2,1}$.

Furthermore, inhibiting signal $In_1$ is common to all of the cells of the block. Consequently, the various rows of the same level behave in a similar manner and have temporal spacing of $$\frac{1}{2F}.$$

FIG. 11 illustrates the input voltage of one of the commutation blocks of the device described with reference to FIG. 6 to 10.

Voltage $Vb_1$ corresponds to the potential difference between the input terminal $7_1$ of the commutation block $6_1$ and the reference terminal $9_1$.

It will be appreciated that, although the voltage source $1_1$ associated with the block $6_1$ is a sinusoidal alternating source, voltage $Vb_1$ has a particular shape because of the variations of the potential of the reference terminal $9_1$ and the inhibiting period of the commutation block $6_1$.

It has a positive portion with a double curve over a period of ⅔ f and a zero portion over a period of ⅓ f corresponding to the inhibiting period of the block $6_1$.

Voltages $Vb_2$ and $Vb_3$ have the same shape as voltage $Vb_1$, being phase-shifted relative to each other by one-third of a period.

Each of the commutation blocks $6_1$, $6_2$ and $6_3$ is inhibited for one-third of the period corresponding to frequency f of the input alternating voltage sources $1_1$, $1_2$ and $1_3$.

The three voltage sources $1_1$, $1_2$ and $1_3$ are further phase-shifted relative to each other by one-third of a period.

The output voltages of the commutation blocks $6_1$, $6_2$ and $6_3$ are illustrated with reference to FIG. 12.

These output voltages $Vs_1$, $Vs_2$ and $Vs_3$ correspond to the potential difference between the output terminals $10_1$, $10_2$ and $10_3$ of the commutation blocks $6_1$, $6_2$ and $6_3$ and the reference terminals $9_1$, $9_2$ and $9_3$ thereof.

They have an envelope corresponding to the general shape of input voltages $Vb_1$, $Vb_2$ and $Vb_3$ which are modulated to frequency F of the control means.

The illustration in FIG. 12 is symbolic and the ratio 20 between frequencies f and F has not been complied with.

The charging currents which appear in the loads $4_1$, $4_2$ and $4_3$ are illustrated with reference to FIG. 13.

It will be appreciated that the charging currents $I4_1$, $I4_2$ and $I4_3$ imposed by the combined voltages $Vs_1-Vs_2$, $Vs_2-Vs_3$ and $Vs_3-Vs_1$ are sinusoidal and have the same frequency f as the input alternating voltage sources $1_1$, $1_2$ and $1_3$.

The strength of these currents is fixed in a continuous manner by control signal Sr being determined.

It will clearly be appreciated that a device for converting electrical energy according to the invention has the advantage, owing to the fact that the input voltage of the commutation blocks always has the same sign or is zero, of being able to use electronic components which are cheaper and of smaller dimensions than existing devices.

Furthermore, the electronic components used in the invention are subjected to stresses in terms of voltage which are less great than those of existing devices.

Therefore, such a device can carry out a conversion of electrical energy of average power or high power between one or more input alternating voltage sources and one or more alternating current sources, using low-cost elements and with adjustment which is rapid, continuous and reliable.

Furthermore, conventional filters are arranged at each of the input alternating voltage sources and at each of the output current sources.

What is claimed is:

1. Device for reversibly converting electrical energy, which device can be connected between at least one input alternating voltage source ($1_1$ to $1_n$) and at least one load ($4_1$ to $4_n$) which forms an output alternating current source ($4_1$ to $4_n$), each input alternating voltage source ($1_1$ to $1_n$) having a supply terminal ($2_1$ to $2_n$) and a neutral terminal ($3_1$ to $3_n$), the device comprising at least one commutation block ($6_1$ to $6_n$) which is suitable for being associated with an output alternating current source ($4_1$ to $4_n$) and which comprises an input terminal ($7_1$ to $7_n$), to which the supply terminal ($2_1$ to $2_n$) of the input alternating voltage source ($1_1$ to $1_n$) can be connected, at least one reference terminal ($9_1$ to $9_n$) and an output terminal ($10_1$ to $10_n$), to which the load ($4_1$ to $4_n$) which forms the output alternating current source can be connected, the block ($6_1$ to $6_n$) also comprising a commutation matrix ($12_1$ to $12_n$) which is formed by capacitors ($20_{j,i,k}$) and commutation cells ($22_{j,i,k}$), which cells are controlled individually by means ($28_{j,i,k}$) for controlling the operation thereof, characterised in that the or each commutation block ($6_1$ to $6_n$) comprises a single reference terminal ($9_1$ to $9_n$) which is at a reference potential different from the potential of the neutral terminal ($3_1$ to $3_n$) of the source ($1_1$ to $1_n$), and in that it comprises means ($13_1$ to $13_n$, 50) for permanent maintenance, at a constant sign or zero, of the potential difference between the input terminal ($7_1$ to $7_n$) and the reference terminal ($9_1$ to $9_n$) of the or each commutation block ($6_1$ to $6_n$).

2. Converting device according to claim 1, characterised in that the matrix ($12_1$ to $12_n$) of the or each block ($6_1$ to $6_n$) comprises at least one level ($30_{j,1}$ to $30_{j,n}$) which comprises at least one row ($32_{j,1}$ to $32_{j,p}$) of commutation cells ($22_{j,i,k}$), which are arranged on the basis of a single commutation cell ($22_{j,i,k}$) for each level ($32_{j,1}$ to $32_{j,p}$) of the same row ($30_{j,1}$ to $30_{j,n}$) each commutation cell ($22_{j,i,k}$) being composed of two elements which form a switch ($24_{j,i,k}$, $26_{j,i,k}$), the or each level ($30_{j,1}$ to $30_{j,n}$) defining two groups of switches which are connected in series and the commutation matrix ($12_1$ to $12_n$) then defining two extreme groups of switches, each commutation cell ($22_{j,i,k}$) being associated with a capacitor ($20_{j,1,k}$) which is sized in order to maintain, between the homologous terminals of the two switches ($24_{j,i,k}$, $26_{j,i,k}$) of each commutation cell ($22_{j,i,k}$), a charging voltage which is equal to a fraction of the voltage of the input alternating voltage source ($1_1$ to $1_n$), which voltage fraction decreases as a function of the row thereof starting from this source, the capacitors ($20_{j,i,k}$) of the same row ($32_{j,1}$ to $32_{j,p}$) being connected in series between the two extreme groups of switches.

3. Device according to claim 2, characterised in that all of the switches ($24_{j,i,k}$, $26_{j,i,k}$) of each commutation cell ($22_{j,i,k}$) are unidirectional in terms of voltage and bidirectional in terms of current.

4. Device according to claim 3, characterised in that all of the switches ($24_{j,i,k}$, $26_{j,i,k}$) of each commutation cell ($22_{j,i,k}$) are formed by electronic components (52, 54) which are unidirectional in terms of voltage and unidirectional in terms of current.

5. Device according to claim 2, characterised in that all of the switches ($24_{j,i,k}$, $26_{j,i,k}$) of each commutation cell ($22_{j,i,k}$) are formed by electronic components (52, 54) which are all identical, and in that each switch is constituted by identical elementary switches (50) which are connected in series and the number of which is a function of the maximum voltage applicable between the terminals thereof.

6. Device according to claim 2, characterised in that it comprises means (34, 40, 42, 44) for monitoring the control means ($28_{j,i,k}$) comprising means (42, 44) for processing a reference signal (Sr) in order to supply at the output a plurality of secondary reference signals ($Sr_1$ to $Sr_n$), and means for transmitting each secondary reference signal to all of the control means ($28_{j,i,k}$) of the commutation cells of the same level of all of the matrices ($12_1$ to $12_n$) of all of the blocks ($6_1$ to $6_n$) of the device.

7. Device according to claim 6, characterised in that the processing means (42, 44) are suitable for supplying a plurality of secondary reference signals ($Sr_1$ to $Sr_n$) which are functions related by a portion of the reference signal (Sr), each secondary reference signal ($Sr_1$ to $Sr_n$) of a level ($30_{j,k}$) having at all times a value greater than or equal to the value of a secondary reference signal of a level which is closer to the voltage source ($1_1$ to $1_n$).

8. Device according to claim 6, characterised in that the monitoring means (34, 40, 42, 44) comprise means for generating a synchronisation signal (34) in order to supply at the output a plurality of secondary synchronisation signals ($Sd_1$ to $Sd_p$), and means for transmitting each secondary synchronisation signal ($Sd_1$ to $Sd_p$) to all of the control means ($28_{j,i,k}$) of the commutation cells of the same row of all of the matrices ($12_1$ to $12_n$) of all of the blocks ($6_1$ to $6_n$) of the device.

9. Device according to claim 1, characterised in that it comprises a single commutation block (6) and can be connected to a single input alternating voltage source (1), the neutral terminal (3) of which is accessible in order to allow a connection and which is associated with a single load (4) which forms an output alternating current source, and in that it further comprises a first capacitor (20) which can be connected between the neutral terminal (3) of the source (1) and an output terminal (5) of the load (4) and a second capacitor (22) which can be connected between the reference terminal (9) of the commutation block (6) and the output terminal (5) of the load (4).

10. Device according to claim 9, characterised in that the means for permanent maintenance, at a constant sign or zero, of the potential difference between the input terminal ($7$; $7_1$, $7_2$) and the reference terminal ($9$; $9_1$, $9_2$) comprise inhibiting means ($13$; $13_1$, $13_2$) which are associated with the or each commutation block ($6$; $6_1$, $6_2$) and which comprise means for evaluating the sign of the potential difference between the input terminal ($7$) and the neutral terminal ($3$) of the source ($1$), which evaluation means are suitable for supplying at the output a signal for inhibiting the commutation block ($6$), and in that the or each commutation block ($6$; $6_1$, $6_2$) is suitable for connecting together the input terminal ($7$; $7_1$, $7_2$), the reference terminal ($9$; $9_1$, $9_2$) and the output terminal ($10$; $10_1$, $10_2$) thereof when the inhibiting signal is received.

11. Device according to claim 10, characterised in that the inhibiting means ($13$) are suitable for supplying the inhibiting signal when the potential difference between the input terminal ($7$) and the neutral terminal ($3$) of the source ($1$) is negative, the commutation matrix ($12$) further being formed by electronic components ($52$, $54$) which are orientated so that the commutation block supports only a positive voltage or zero voltage.

12. Device according to claim 10, characterised in that the inhibiting means ($13$) are suitable for supplying the inhibiting signal when the potential difference between the input terminal ($7$) and the neutral terminal ($3$) of the source ($1$) is positive, the commutation matrix ($12$) further being formed by electronic components ($52$, $54$) which are orientated so that the commutation block supports only a negative voltage or zero voltage.

13. Device according to claim 1, characterised in that it comprises a single commutation block ($6$) and can be connected to a single input alternating voltage source ($1$), the neutral terminal ($3$) of which is accessible in order to allow a connection and which is associated with a single load ($4$) which forms an output alternating current source, and in that it comprises a shift block ($14$) which comprises an input terminal ($15$) which is suitable for being connected to the neutral terminal ($3$) of the source ($1$), a reference terminal ($16$) which is connected to the reference terminal ($9$) of the commutation block ($6$) and an output terminal ($17$) which can be connected to the output terminal ($5$) of the load ($4$), the shift block ($14$) allowing the potential of the output terminal ($17$), which can be connected to an output terminal ($5$) of the load ($4$), to be modified.

14. Device according to claim 1, characterised in that it comprises a first commutation block ($6_1$) and a second commutation block ($6_2$) and can be connected to a single input alternating voltage source ($1$), the neutral terminal ($3$) of which is accessible in order to allow a connection and which is associated with a single load ($4$) which forms an output alternating current source, the reference terminals of the two commutation blocks ($6_1$, $6_2$) being connected to each other, the first commutation block ($6_1$) being suitable for being connected at the input terminal ($7_1$) thereof to the supply terminal ($2$) of the source ($1$), the second commutation block ($6_2$) being suitable for being connected at the input terminal ($7_2$) thereof to the neutral terminal ($3$) of the source ($1$), the device further being suitable for connecting the load ($4$) between the output terminals ($10_1$, $10_2$) of the two commutation blocks.

15. Device according to claim 1, characterised in that it can be connected to at least two input alternating voltage sources ($1_1$ to $1_n$), the neutral terminals ($3_1$ to $3_n$) of which are all connected to each other and which are associated with the same number of loads ($4_1$ to $4_n$) which form output alternating current sources and output terminals ($5_1$ to $5_n$) of which are also all connected to each other, and in that it comprises a plurality of commutation blocks ($6_1$ to $6_n$), the reference terminals ($9_1$ to $9_n$) of the commutation blocks ($6_1$ to $6_n$) all being connected to each other.

16. Device according to claim 15, characterised in that the neutral terminals ($3_1$ to $3_n$) of the sources ($1_1$ to $1_n$) are accessible in order to allow a connection, and in that it comprises a shift block ($14$) which comprises an input terminal ($15$) which is suitable for being connected to the neutral terminals ($3_1$ to $3_n$), a reference terminal ($16$) which is connected to all of the reference terminals ($9_1$ to $9_n$) of the commutation blocks ($6_1$ to $6_n$) and an output terminal ($17$) which can be connected to all of the output terminals ($5_1$ to $5_n$) of the loads ($4_1$ to $4_n$) which form an output alternating current source, the shift block ($14$) allowing the potential of the output terminal ($17$), which can be connected to the output terminals ($5_1$ to $5_n$) of the loads ($4_1$ to $4_n$), to be modified.

17. Device according to claim 15, characterised in that the means for permanent maintenance, at a constant sign or zero, of the potential difference between the input terminal ($7_1$ to $7_n$) and the reference terminal ($9_1$ to $9_n$) comprise inhibiting means ($13_1$ to $13_n$) which are associated with the or each commutation block ($6_1$ to $6_n$) and which comprise means for comparing the potential difference between the input terminals ($7_1$ to $7_n$) and a terminal having a potential common to all of the commutation blocks ($6_1$ to $6_n$), such as the neutral terminals ($3_1$ to $3_n$) of the sources ($1_1$ to $1_n$), the output terminals ($5_1$ to $5_n$) of the loads ($4_1$ to $4_n$) or the reference terminals ($9_1$ to $9_n$), which means are suitable for supplying at the output signals for inhibiting the commutation blocks ($6_1$ to $6_n$); and in that the or each commutation block ($6_1$ to $6_n$) is suitable for connecting together the input terminal ($7_1$ to $7_n$), the reference terminal ($9_1$ to $9_n$) and the output terminal ($10_1$ to $10_n$) thereof when the inhibiting signal is received.

18. Device according to claim 17, characterised in that the inhibiting means ($13_1$ to $13_n$) are suitable for supplying an inhibiting signal only to the block whose potential difference between the input terminals ($7_1$ to $7_n$) and a terminal having a potential common to all of the commutation blocks ($6_1$ to $6_n$), such as the neutral terminals ($3_1$ to $3_n$) of the sources ($1_1$ to $1_n$), the output terminals ($5_1$ to $5_n$) of the loads ($4_1$ to $4_n$) or the reference terminals ($9_1$ to $9_n$), is the weakest, the commutation matrices ($12_1$ to $12_n$) further being formed by electronic components ($52$, $54$) which are orientated so that the blocks ($6_1$ to $6_n$) support only a positive voltage or zero voltage.

19. Device according to claim 18, characterised in that the inhibiting means ($13_1$ to $13_n$) are suitable for supplying an inhibiting signal only to the block whose potential difference between the input terminals ($7_1$ to $7_n$) and a terminal having a potential common to all of the commutation blocks ($6_1$ to $6_n$), such as the neutral terminals ($3_1$ to $3_n$) of the sources ($1_1$ to $1_n$), the output terminals ($5_1$ to $5_n$) of the loads ($4_1$ to $4_n$) or the reference terminals ($9_1$ to $9_n$), is the greatest, the commutation matrices ($12_1$ to $12_n$) further being formed by electronic components ($52$, $54$) which are orientated so that the blocks ($6_1$ to $6_n$) support only a negative voltage or zero voltage.

20. Device according to claim 1, characterised in that it is suitable for being connected to three input alternating voltage sources ($1_1$ to $1_3$) which form the three phases of a three-phase electrical energy supply network.

21. Device according to claim 20, characterised in that each matrix ($12_1$, $12_2$ and $12_3$) of each commutation block ($6_1$, $6_2$, $6_3$) comprises a single capacitor ($20_{j,i,k}$) and a single commutation cell ($2_{j,i,k}$).

* * * * *